United States Patent
Chmiel et al.

(10) Patent No.: US 9,361,724 B2
(45) Date of Patent: **\*Jun. 7, 2016**

(54) VISUAL CONNECTIVITY OF WIDGETS USING EVENT PROPAGATION

(71) Applicant: International Business Machines Corporation, Armonk, NY (US)

(72) Inventors: Matthew S. Chmiel, Ottawa (CA); Jason Hiltz-Laforge, Ottawa (CA); Alireza Pourshahid, Ottawa (CA); Graham A. Watts, Ottawa (CA)

(73) Assignee: International Business Machines Corporation, Armonk, NY (US)

(*) Notice: Subject to any disclaimer, the term of this patent is extended or adjusted under 35 U.S.C. 154(b) by 675 days.

This patent is subject to a terminal disclaimer.

(21) Appl. No.: 13/787,597

(22) Filed: Mar. 6, 2013

(65) Prior Publication Data
US 2013/0181996 A1    Jul. 18, 2013

Related U.S. Application Data (63) Continuation of application No. 13/076,696, filed on Mar. 31, 2011.

(51) Int. Cl.
| G06F 3/0481 | (2013.01) |
| G06T 13/80 | (2011.01) |
| G06T 11/20 | (2006.01) |
| G06T 11/60 | (2006.01) |
| G06F 9/44 | (2006.01) |

(52) U.S. Cl.
CPC ............ *G06T 13/80* (2013.01); *G06F 3/04812* (2013.01); *G06F 3/04817* (2013.01); *G06F 8/34* (2013.01); *G06T 11/206* (2013.01); *G06T 11/60* (2013.01)

(58) Field of Classification Search
CPC .................. G06F 3/04817; G06F 3/04812
See application file for complete search history.

(56) References Cited

U.S. PATENT DOCUMENTS

| 6,510,352 | B1 | 1/2003 | Badavas et al. |
| 6,661,438 | B1 | 12/2003 | Shiraishi et al. |
| 6,907,578 | B2 | 6/2005 | Wilson et al. |
| 7,076,736 | B2 | 7/2006 | Hugh |
| 7,162,510 | B2 | 1/2007 | Jammes |
| 7,296,240 | B1 | 11/2007 | Yalovsky et al. |
| 7,356,774 | B2 | 4/2008 | Shah et al. |
| 7,574,675 | B1 | 8/2009 | Linker et al. |
| 7,770,125 | B1 | 8/2010 | Young et al. |
| 8,001,485 | B2 | 8/2011 | Sipher et al. |
| 8,027,349 | B2 | 9/2011 | Brown et al. |
| 8,316,316 | B2 | 11/2012 | Christensen et al. |
| 8,327,280 | B2 | 12/2012 | Nattinger |

(Continued)

OTHER PUBLICATIONS

Office Action dated Aug. 22, 2013 in U.S. Appl. No. 13/076,696, 8 pgs.

(Continued)

*Primary Examiner* — Steven Sax
(74) *Attorney, Agent, or Firm* — Shumaker & Sieffert, P.A.

(57) ABSTRACT

A method, system and computer program product receive a set of objects for connection, create a moving object within the set of objects, display visual connection cues on objects in the set of objects, adjust the visual connection cues of the moving object and a target object in the set of objects, identify event propagation precedence, and connect the moving object with the target object.

9 Claims, 6 Drawing Sheets

(56) References Cited

U.S. PATENT DOCUMENTS

| | | | |
|---|---|---|---|
| 8,332,827 B2 | 12/2012 | Eddie et al. |
| 8,341,646 B2 | 12/2012 | Bornhoevd et al. |
| 8,407,661 B2 | 3/2013 | Wang et al. |
| 8,799,212 B2 | 8/2014 | Rusch |
| 2001/0049721 A1 | 12/2001 | Blair et al. |
| 2003/0004952 A1 | 1/2003 | Nixon et al. |
| 2003/0222915 A1 | 12/2003 | Marion et al. |
| 2004/0015835 A1 | 1/2004 | Kotnur et al. |
| 2005/0257165 A1 | 11/2005 | Ben-Shachar et al. |
| 2005/0268173 A1 | 12/2005 | Kudukoli et al. |
| 2007/0124699 A1 | 5/2007 | Michaels |
| 2007/0157100 A1 | 7/2007 | Wiggen |
| 2007/0277151 A1 | 11/2007 | Brunel et al. |
| 2009/0019397 A1 | 1/2009 | Buffet et al. |
| 2009/0070409 A1 | 3/2009 | Clayton et al. |
| 2010/0037157 A1 | 2/2010 | Chang et al. |
| 2010/0058296 A1 | 3/2010 | Nattinger |
| 2010/0211580 A1 | 8/2010 | Sreekanth |
| 2011/0049237 A1 | 3/2011 | Edwards et al. |
| 2011/0307360 A1 | 12/2011 | Duparc et al. |
| 2012/0249555 A1 | 10/2012 | Chmiel et al. |

OTHER PUBLICATIONS

Response filed Nov. 22, 2013 to the Office Action dated Aug. 22, 2013 in U.S. Appl. No. 13/076,696, 9 pgs.

Final Office Action from U.S. Appl. No. 13/076,696, mailed Mar. 12, 2014, 9 pp.

Applicant-Initiated Interview Summary from U.S. Appl. No. 13/076,696, dated May 22, 2014, 4 pp.

Amendment in Response to Final Office Action mailed Mar. 12, 2014, from U.S. Appl. No. 13/076,696, filed Jun. 11, 2014, 12 pp.

Amendment in response to Final Office Action mailed Mar. 12, 2014 and Advisory Action mailed Jun. 24, 2014, from U.S. Appl. No. 13/076,696, filed Jul. 10, 2014, 12 pp.

Office Action from U.S. Appl. No. 13/076,696, dated Oct. 3, 2014, 9 pp.

Amendment in Response to Office Action mailed Oct. 3, 2014, from U.S. Appl. No. 13/076,696, filed Jan. 5, 2015, 10 pp.

Ahmet Soylu et al., "Toward Developing a Semantic Mash-up Personal and Pervasive Learning Enivronment: SMupple," URL:http://www.google.co.in/url?sa=t&source=web&cd=4&ved=0CDEQFjAD&url=http%3A%2F%2Fwww.moedritscher.com%2Fpapers%2Fpaper_soylu_et_al_smuppleapproach_2010.pdf&rct=j&q=Toward%20Developing%20a%20Semantic%20Mash-up%20Personal%20and%20Pervasive%20Learning%20Environment%3A%20SMupple&ei=taX-, (p. 1) Dec. 8, 2010.

Rattapoom Tuchinda et al., "Building Mashups by Example," URL: http://portal.acm.org/citation.cfm?id=1378773.1378792 (10 pages) (downloaded Dec. 8, 2010).

Nassim Laga et al., "Building a user friendly service dashboard: Automatic and non-intrusive chaining between widgets," URL:http://www.it-sudparis.eu/dpt/rs2m/ncpub/2009/WebX/webX2009CameraReady1.pdf (8 pages) (downloaded Dec. 8, 2010).

Tobias Nelkner, "An Infrastructure for Intercommunication Between Widgets in Personal Learning Environments," URL: http://www.springerlink.com/content/wm2r08466j217835/ (8 pages) (downloaded Dec. 8, 2010).

Response to Final Office Action dated May 6, 2015, from U.S. Appl. No. 13/076,696, filed Jul. 6, 2015, 8 pp.

Notice of Allowance from U.S. Appl. No. 13/076,696, dated Aug. 25, 2015, 8 pp.

Final Rejection from U.S. Appl. No. 13/076,696, dated May 6, 2015, 10 pp.

VISUAL CONNECTIVITY OF WIDGETS USING EVENT PROPAGATION

This application is a continuation of Ser. No. 13/076,696, filed on Mar. 31, 2011, entitled VISUAL CONNECTIVITY OF WIDGETS USING EVENT PROPAGATION, the entire content of which is incorporated herein by reference.

BACKGROUND

This disclosure relates generally to connectivity in a data processing system and more specifically to visual connectivity of objects using event propagation in the data processing system. Self-service mash-up and dashboard environments have gained attention in recent years. This type of environment enables users to address specific business needs to aide in solving business problems. An important and common feature in mash-up environments is widget connectivity. Widget connectivity is often used by users to send information using a type of event mechanism from one widget to another specific widget or broadcast an event to all other widgets on the dashboard.

BRIEF SUMMARY

According to embodiments of the invention, methods, system and computer program products receive a set of objects for connection, create a moving object within the set of objects, display visual connection cues on objects in the set of objects, adjust visual connection cues of the moving object and a target object, identify event propagation precedence, and connect the moving object with the target object.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present invention may be written in any combination of one or more programming languages, including an object oriented programming language such as Java™, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational acts to be performed on the computer or other programmable apparatus to produce a computer-implemented method such that the instructions which execute on the computer or other programmable apparatus provide processes for implementing the functions/acts specified in the flowchart and/or block diagram block or blocks.

In some examples, establishing one or more events may be a challenging experience for an average business user. For example, establishing events may require a level of technical knowledge and users have to deal with complex dialogs, understand an event mechanism and payloads passed between the widgets to create own custom mash-ups.

Some mash-up environments have tried to address the issue by connecting all widgets together automatically as soon as the widgets are added to a mash-up. Although simple cases are typically addressed the approach still has major shortcomings. For example, as soon as users need to perform minor customization in the connectivity of the widgets, the users still have to deal with complex settings and dialogs. In another example, auto connectivity is typically only useful for applications using a broadcast style of communication. Auto connectivity does not satisfy requirements of applications that rely on point-to-point style communication and also applications in which the order events are passed between widgets is important. Prior solutions have typically coupled widgets using only metadata associated with the widgets. While some previous solutions provided a good mashup environment that not only allowed widgets to be connected but also allowed data from different widget to be transformed the wiring task in environment and wiring infrastructure was difficult to work with.

Figure 1:
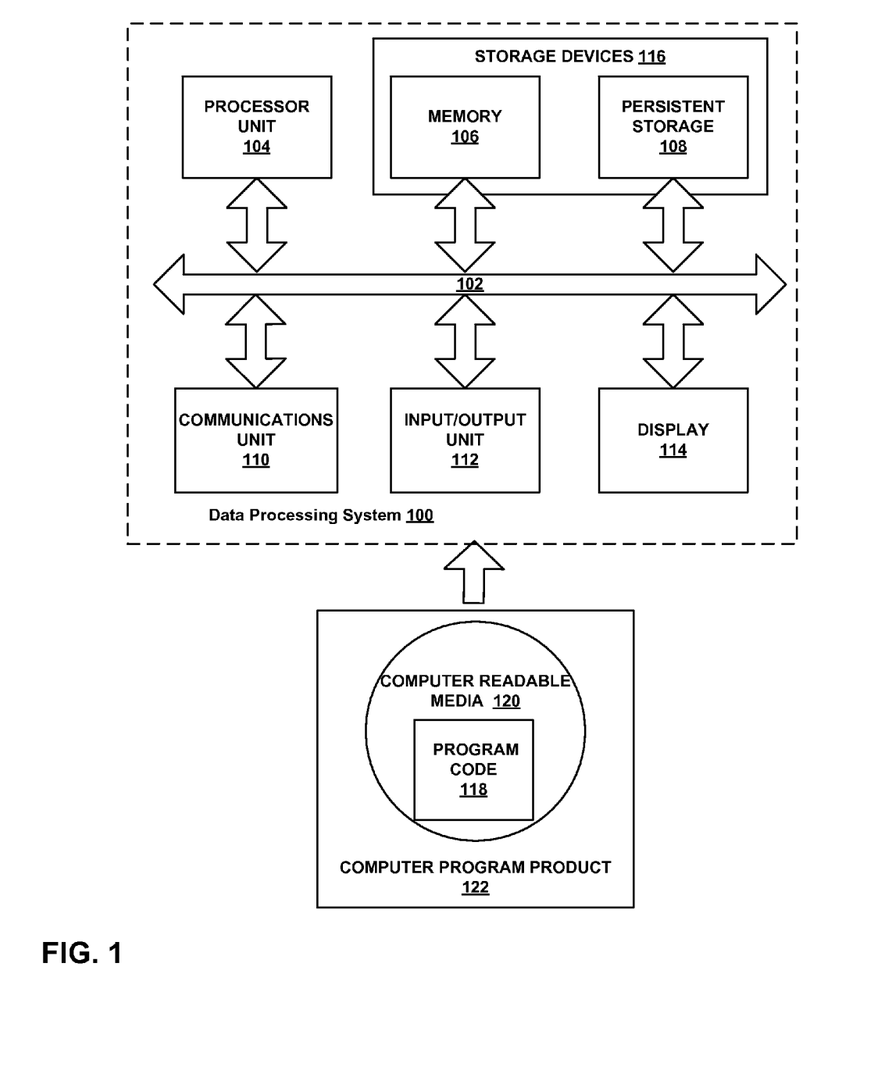
FIG. 1 is a block diagram of an exemplary data processing system operable for various embodiments of the invention.

Turning now to FIG. 1 a block diagram of an exemplary data processing system operable for various embodiments of the invention is presented. In this illustrative example, data processing system 100 includes communications bus 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications bus 102. In these illustrative examples the instructions are in a functional form on persistent storage 108. These instructions may be loaded into memory 106 for execution by processor unit 104. The methods of the different embodiments may be performed by processor unit 104 using computer-implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive, a thumb drive, or a flash memory that is connected to data processing system 100. The tangible form of computer readable media 120 is also referred to as computer recordable storage media. In some instances, computer readable media 120 may not be removable.

Alternatively, program code 118 may be transferred to data processing system 100 from computer readable media 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 may be any hardware apparatus that may store data. Memory 106, persistent storage 108 and computer readable media 120 are examples of storage devices in a tangible form.

In another example, a bus system may be used to implement communications bus 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications bus 102.

Using data processing system 100 of FIG. 1 as an example, an illustrative embodiment provides the computer-implemented method stored in memory 106, executed by processor unit 104, for visual connectivity of objects using event propagation. Processor unit 104 receives a set of objects for connection from storage devices 116, communications unit 110, or input/output unit 112. Processor unit 104 creates a moving object within the set of objects and displays visual connection cues on objects in the set of objects using display 114. Processor unit 104 further adjusts visual connection cues of the moving object and a target object, identifies event propagation precedence and connects the moving object with the target object.

In an alternative embodiment, program code 118 containing the computer-implemented method for visual connectivity of objects using event propagation may be stored within computer readable media 120 as computer program product 122. In another illustrative embodiment, the method for visual connectivity of objects using event propagation may be implemented in an apparatus comprising a communications bus, a memory connected to the communications bus, wherein the memory contains computer executable program code, a communications unit connected to the communications bus, an input/output unit connected to the communications bus, a display connected to the communications bus, and a processor unit connected to the communications bus. The processor unit of the apparatus executes the computer executable program code to direct the apparatus to perform the method.

Figure 2:
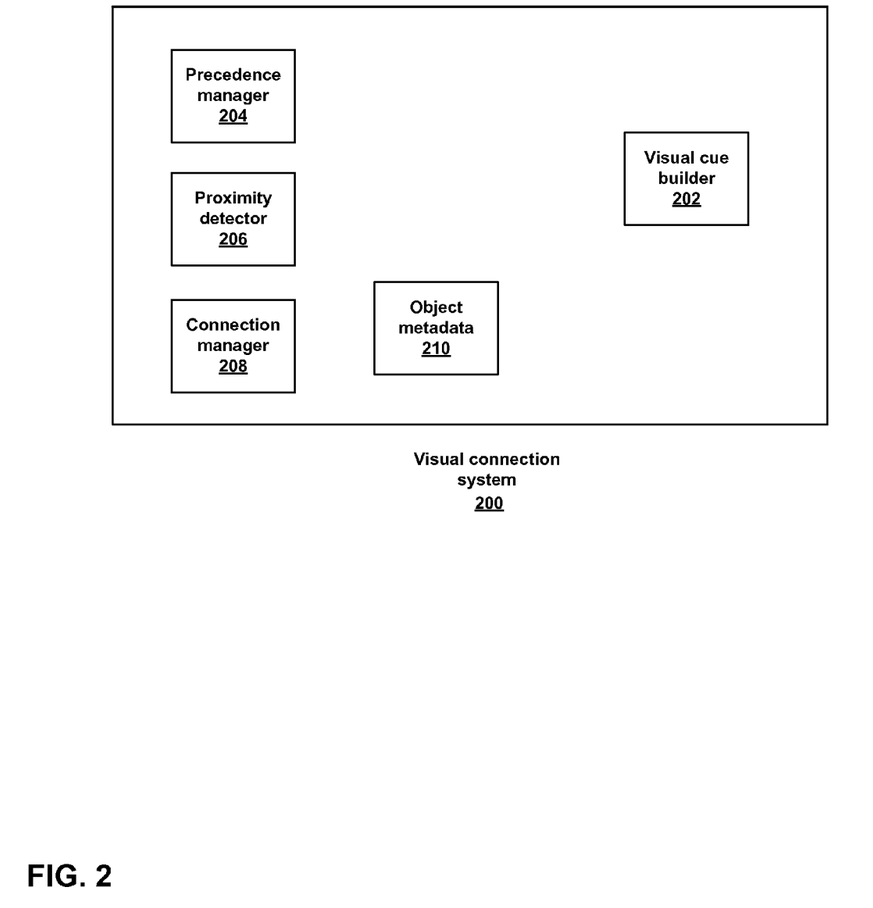
FIG. 2 is a block diagram of a visual connection system in accordance with various embodiments of the invention.

With reference to FIG. 2, a block diagram of a visual connection system, in accordance with various embodiments of the invention is presented. Visual connection system 200 is an exemplary illustrative embodiment of the disclosed method.

In contrast with previous solutions, embodiments of the invention address the problems previously described by providing an easy method for average business users to connect the widgets together. Illustrative embodiments of the disclosed method typically enable business users to customize connectivity between widgets very easily without considering how communication is performed and specification of the order in which widgets communicate in a visual interaction.

Illustrative embodiments exploit physical connectivity and proximity of widgets using a visual environment. When users physically connect two widgets capable of communicating with each other (for example, one widget is a publisher of an event and the other widget is a subscriber of the event), the widgets will communicate immediately and automatically without any further setup required by the user. The communication is point-to-point between the two widgets. Other widgets can also be connected to the just established group and depending on where the widgets are connected the order in which the widgets receive the event differs. Illustrative embodiments of the disclosed method also provide visual aids for users.

Visual connection system 200 is supported by a foundation of components of a data processing system such as data processing system 100 of FIG. 1. Visual connection system 200 enhances an underlying data processing providing components including visual cue builder 202, precedence manager 204, proximity detector 206, connection manager 208 and object metadata 210. Embodiments of visual connection system 200 may exist in various forms including a collection of components as shown or a monolithic composition of functions without limiting the capability of the disclosed method.

Visual cue builder 202 provides a capability to generate or select previously created elements depicting a visual cue representing a communication or connectivity capability of an object. For example, an input connection capability may be provided in a user interface representation of an object as a form of receiving handle or connection. In another example a visual cue representing an output connection may be formed in the shape of an arrowhead, pointing outward from the body of a widget image. Visual cue builder 202 accesses information from object metadata 210 associated with an object; in the current example the object represents a widget. The accessed information of object metadata 210 contains a number of properties including a description the type of connectivity supported by the object and location of connections. The location of connections is used to determine where to place the visual cue generated by visual cue builder 202 on a respective object. For example, location may be determined as one of top, bottom, left side or right side of the image representing the widget of the current example.

Precedence manager 204 provides a capability to determine and select in which order an object connection is performed. Determination of precedence includes whether ordering is required and when order is required to establish a connection in conformance with a prescribed order. For example, precedence manager 204 uses information from object metadata 210 associated with an object to determine whether precedence support is required. When required, an ordering is identified and performed. When a predetermined order cannot be fulfilled an error is raised. Order may be determined by an event type or predetermined specification using precedence or dependency information derived from information in object metadata 210.

Proximity detector 206 provides a capability to determine a spatial location of an object relative to another object. For example, using the widget example previously described, when a user selects a widget and drags the selected widget toward another widget, proximity detector 206 monitors the changing position of the widgets in relation to each other. When a predetermined distance between widgets is attained proximity detector 206 provides a signal. For example, visual cue builder 202 alters the visual cue created for a moving widget and a target widget to indicate a potential connection point being ready and active using the signal.

Connection manager 208 provides a capability to form a connection between objects or widgets in the current example. Specific operation of connection manager 208 is beyond the scope of the present disclosure. Connection manager 208 has capability to form connections according to connection type, event type, and precedence order and to transform of convert between disparate connections. Objects to be connected are presumed to have a connectivity capability. Connection manager 208 cannot create a connection in situations where an object does not provide a connectivity capability.

Connection manager 208 ensures a precedence order when such an order has been determined by information in object metadata 210 or during a connection operation performed by a user using the described method.

Figure 3:
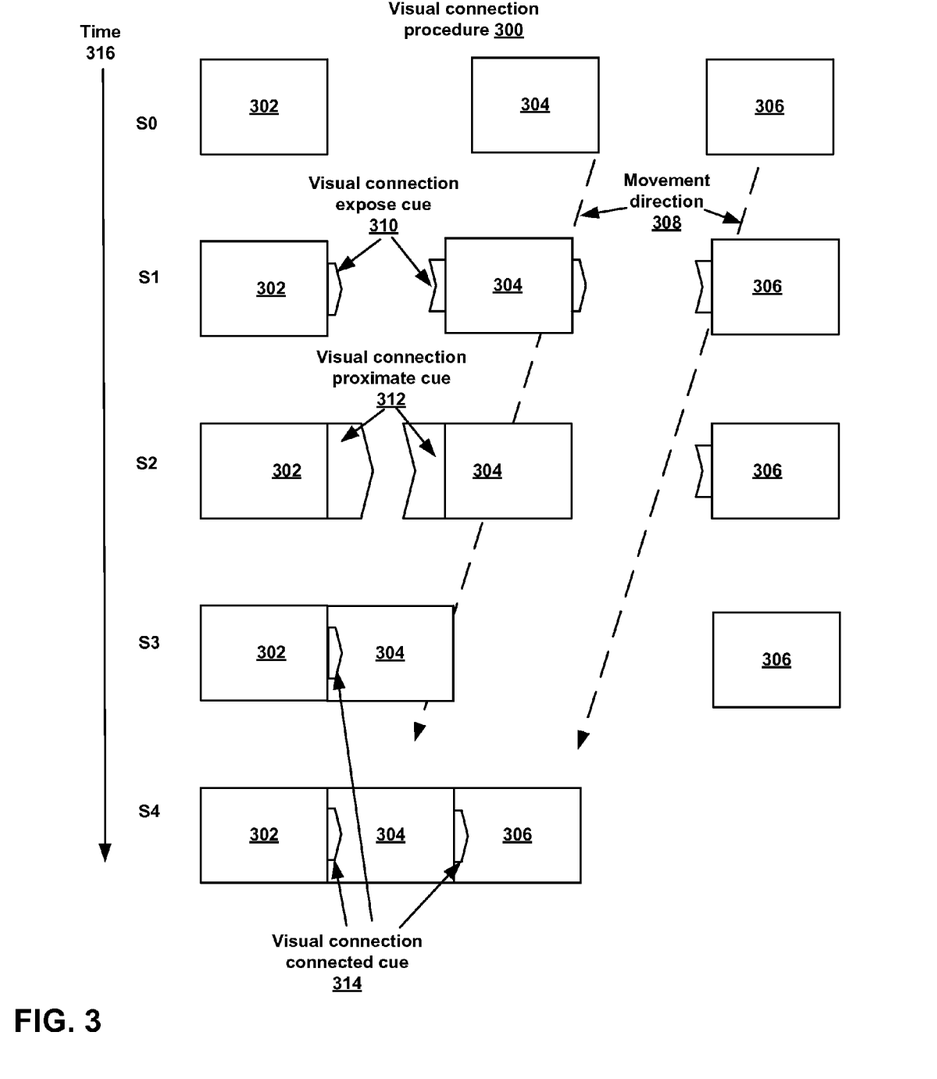
FIG. 3 is a block diagram of a connection procedure using the visual connection system of FIG. 2, in accordance with one embodiment of the invention.

With reference to FIG. 3, a block diagram of a connection procedure using the visual connection system of FIG. 2, in accordance with one embodiment of the invention is presented. Visual connection procedure 300 is an example of a method using visual connection system 200 of FIG. 2.

In exemplary visual connection procedure 300 a series of operations for connecting three widgets, widget 302, widget 304 and widget 306 together in a specific order is presented. In this example, the three widgets are contained in a mashup environment, but more widgets or fewer widgets can be considered equally well by the disclosed method. Visual connection procedure 300 progresses along a time line of time 316 through a series of operations S0, S1, S2, S3 and S4. The procedure commences when the three widgets are received for processing as at time 316 of S0.

Initially a user has no information whatsoever on how the widgets can communicate with each other. In a common mashup environment typically the only way to determine how communication is accomplished requires the user to view a properties dialog of widgets or some other dialog specifically designed for communication with another widget. Widgets of the procedure in the example are processed using a movement from top to bottom and right to left as indicated by movement direction 308.

Using visual connection procedure 300 at time 316 of S1, as soon as the user starts moving one of the widgets, for example widget 304 visual indications are made visible on the widgets that can publish or subscribe to the events published or subscribed by the moving widgets. For example when widget 304 both publishes and subscribes an event a visual indication is exposed in the form of head and tail represented by visual connection expose cue 310. Widget 302 only publishes and presents only a head portion represented by visual connection expose cue 310. Widget 306 only subscribes to the same event and therefore only presents a tail portion represented by visual connection expose cue 310.

As seen at time 316 of S2 when widget 304 is moved closer to widget 302 the connectors previously represented by visual connection expose cue 310 become active and ready to be connected to each other and are represented by visual connection proximate cue 312. The visual representation may be configured to suit an installation and serve notice to a user of the impending connectivity.

At time 316 of S3 the user has dropped widget 304 and the mouse has been released widget 302 and widget 304 are connected. Visual connection cues are no longer shown on widget 306. The enlarged visual representation of visual connection proximate cue 312 is not used and has been replaced by visual connection connected cue 314.

At time 316 of S4 the user further connects widget 306 to widget 304 following the same operations just described. The example illustrates a set of three widgets connected linearly but other numbers of widgets can be connected in other arrangements as shown in further examples.

Using visual connection procedure 300, widget 302, widget 304 and widget 306 did not have previous communications with each other are connected using only two drag gestures on a user interface while the user is guided with visual indications of available connectivity capability on each the widget.

Furthermore, the widgets of the example of FIG. 3 are connected in a specific order. Therefore when an application requires an order of communication between widgets, a business user can typically perform the task of connecting widgets properly. In another example, widget 1 is a filter widget enabling a user to pick a data item (for example, a product line or year), widget 2 is another filter widget, using the data item received as an event payload, displays available values for that data item (for example displaying years of: 2010, 2009, and 2008 and product lines of: home hardware and furniture) and widget 3 is a report widget filtering the data based on filter values received as a result of a filter event (for example, when year value 2010 is received, data related to year 2010 is displayed and when the product line furniture is received, data related to furniture products and not all the products is displayed.

Users typically connect or put near one another, widgets believes to be connected in some manner. The technique described in visual connection procedure 300 connects widgets automatically through events or other communication channel without the user having detailed knowledge of communication protocols. An embodiment of visual connection procedure 300 therefore enables a user to put widgets together while the application makes the widgets work together.

Figure 4:
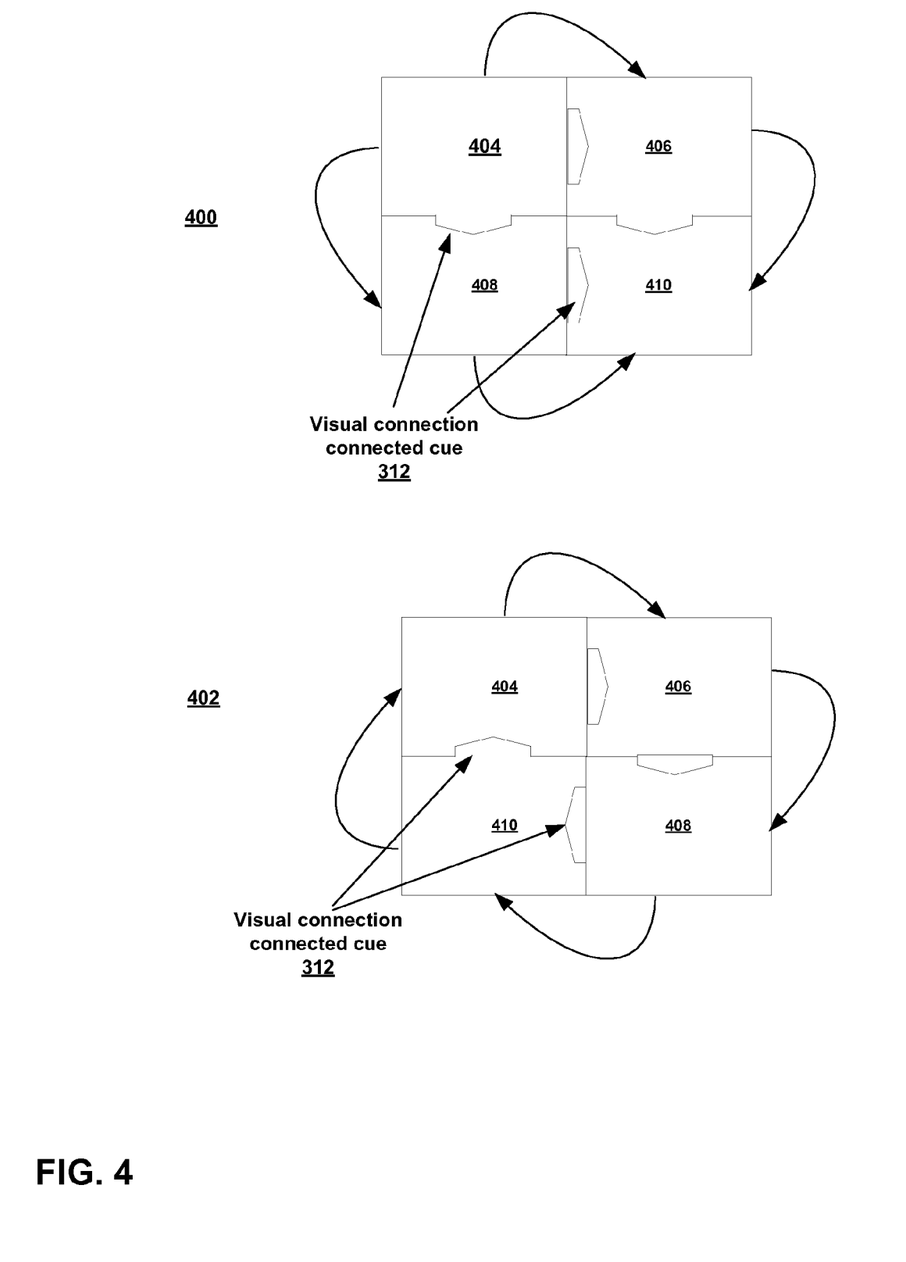
FIG. 4 is a block diagram of connection orientation using the connection procedure of FIG. 3, in accordance with one embodiment of the invention.

With reference to FIG. 4 a block diagram of connection orientation using the connection procedure of FIG. 3, in accordance with one embodiment of the invention is presented. Connection orientation 400 and connection orientation 402 are examples of using visual connection procedure 300 to achieve different connection results.

In another illustrative embodiment, considering a location in which widgets are connected together for different purposes enhances visual connection procedure 300 of FIG. 3. For example a scenario depends upon the order an event is fired. Connection orientation 400 depicts widget 404 having widget 406 on the right side with widget 408 on the bottom of widget 404, and widget 410 on the bottom of widget 406. Visual connection connected cue 312 as previously seen in visual connection procedure 300 of FIG. 3 represents a connection has been made connecting each widget to two other widgets.

When an interaction with widget 440 causes an event to be fired, widget 406 first receives the event and widget 408 receives the event afterwards. Widget 410 receives event information from widget 406 and 408. The specific order can have a potentially different effect on the end result in widget 410 when the event is fired in a reverse order.

Connection orientation 402 depicts widget 404 having widget 406 on the right side with widget 408 on the bottom of widget 406, and widget 410 on the bottom of widget 404. Visual connection connected cue 312 as previously seen in visual connection procedure 300 of FIG. 3 represents a connection made connecting each widget to two other widgets.

The connection orientation in connection orientation 402 represents a clockwise orientation. The specific orientation may be the result of orientation precedence or dependency information specified in object metadata 210 of visual connection system 200 of FIG. 2 associated with the set of widgets. In another example, a user positioned the widgets in a specific arrangement to determine whether the arrangement was permitted and the outcome was as desired. Metadata can specify whether manual override of a predetermined orientation is permitted. Default arrangements can also be configured in addition to information specifying location by event type.

Figure 5:
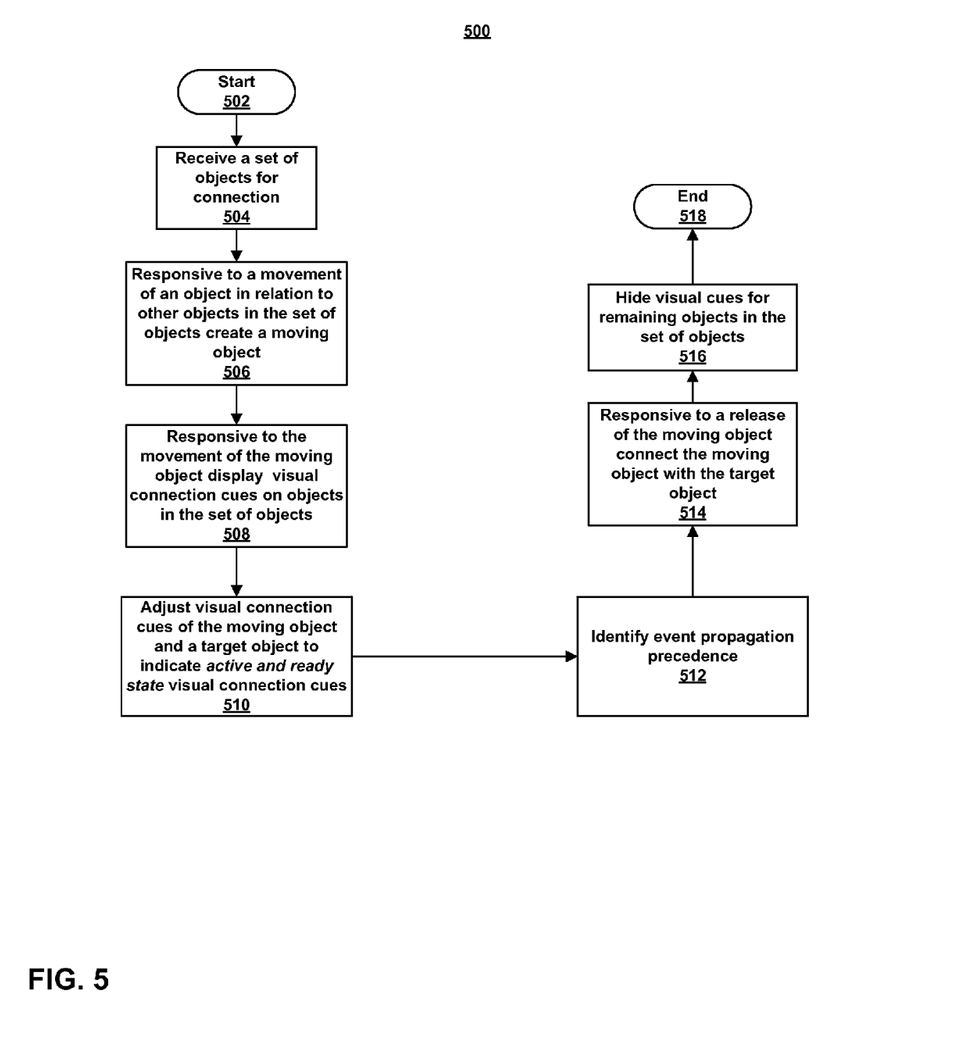
FIG. 5 is a flowchart of a high level view of a visual connection method using the visual connection system of FIG. 2, in accordance with one embodiment of the invention.

With reference to FIG. 5 a flowchart of a high level view of a visual connection method using the visual connection system of FIG. 2, in accordance with one embodiment of the invention is presented. Method 500 is an example of using an embodiment of visual connection system 200 of FIG. 2 with visual connection procedure 300 of FIG. 3. The terms object and widget are used interchangeably throughout the example, as before.

Method 500 begins (act 502) and receives a set of objects for connection (act 504). A set of objects for connection contains one or more widgets wherein each widget has a capability of connecting with at least one other widget in the set. Widgets that are not capable of communicating are filtered out of the set.

Responsive to a user moving an object in relation to other objects in the set of objects method 500 creates a moving object (act 506). Object movement typically occurs using a mouse when performing a drag and drop operation in a graphical user interface. Moving an object with intent to connect with another object initiates processing of the visual connection system.

Responsive to the movement of the moving object method 500 displays visual connection cues on objects in the set of objects (act 508). Visual cues representative of the connection supported by a widget are displayed in association with a respective widget. For example where a widget supports an input type event and output type event visual cues indicative of both types are displayed with the widget in the user interface.

As the moving object continues to move method 500 adjusts the visual cues of the moving object and a target object to indicate active and ready state visual connection cues (act 510). A target object or widget is typically determined by proximity detection. The closer a widget is to a moving object the more likely the widget is a target. For example, proximity sensitivity can be adjusted using proximity detector 206 of visual connection system 200 of FIG. 2.

Method 500 identifies event propagation precedence (act 512). Propagation precedence is typically determined by information contained in metadata associated with the set of objects. Propagation precedence may be specified in the metadata of widgets but may be superseded by user provided position ordering. Responsive to detecting a release of the moving object, method 500 connects the moving object with the target object (act 514). Method 500 sets visual cues for remaining objects in the set of objects to non-display (act 516) and terminates thereafter (act 518).

Figure 6:
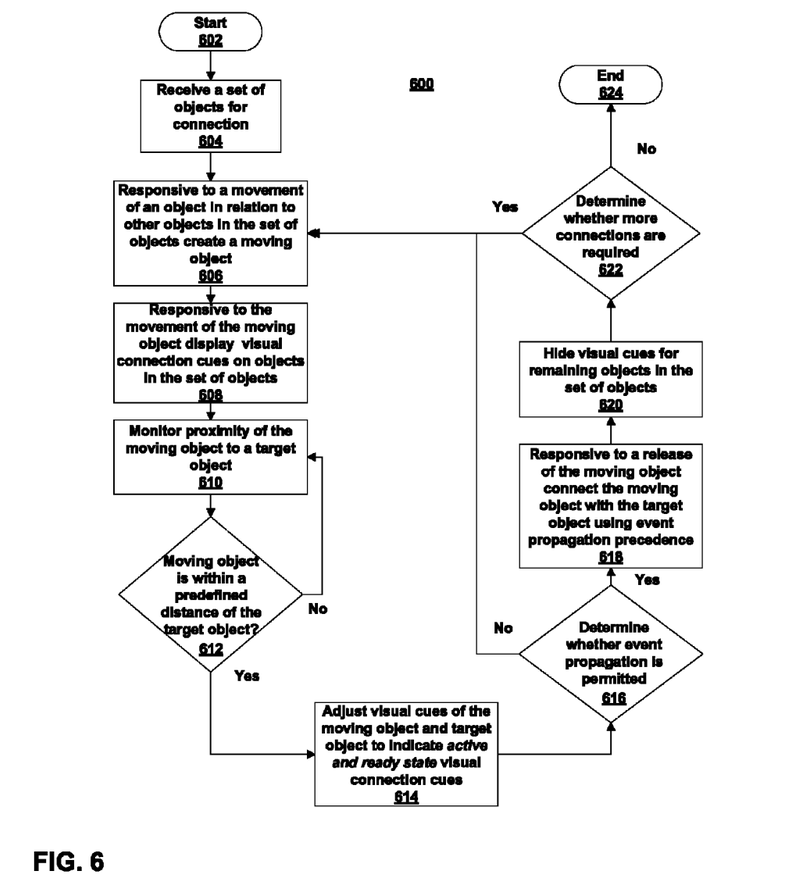
FIG. 6 is a flowchart of a detail view of the visual connection method of FIG. 5, in accordance with one embodiment of the invention.

With reference to FIG. 6 a flowchart of a detail view of the visual connection method of FIG. 5, in accordance with one embodiment of the invention is presented.

Method 600 is a further detailed example of using an embodiment of visual connection system 200 of FIG. 2 with visual connection procedure 300 of FIG. 3.

Method 600 begins (act 602) and receives a set of objects for connection (act 604). A set of objects for connection contains one or more widgets wherein each widget has a capability of connecting with at least one other widget in the set.

Responsive to a user moving an object in relation to other objects in the set of objects method 600 creates a moving object (act 606). Object movement typically occurs when a user using a mouse drags and drops an object in a graphical user interface. Moving an object with intent to connect with another object typically initiates processing in the scope of the visual connection system.

Responsive to the movement of the moving object method 600 displays visual connection cues on objects in the set of objects (act 608). Visual cues representative of the connection supported by a widget are displayed with a respective widget. For example where a widget supports an input type event and output type event visual cues indicative of both types are displayed with the widget in the user interface. Typically visual connection cues for a widget are displayed about the circumference of the widget. Other forms of associative display may also be used; for example, when a list of possible connections is present the list may be collapsed to indicia, which flare out when rolled over by a mouse to display members.

Method 600 monitors proximity of the moving object to a target object (act 610). A target object or widget is typically determined by proximity detection. The closer a widget is to a moving object the more likely the widget is a target. For example, proximity sensitivity can be adjusted using proximity detector 206 of visual connection system 200 of FIG. 2. Method 600 determines whether the moving object is within a predefined distance of the target object (act 612). A predefined distance is typically provided using metadata for the graphical user interface of the method of the visual connection system. When a determination is made that the moving object is not within a predefined distance of the target object a "no" result is obtained and method 600 loops back to perform act 610 as before.

When a determination is made that the moving object is within a predefined distance of the target object a "yes" result is obtained and as the moving object continues to move method 600 adjusts the visual cues of the moving object and a target object to indicate active and ready state visual connection cues (act 614).

Method 600 determines whether event propagation is permitted (act 616). Propagation precedence and permission is typically determined by information contained in metadata associated with the set of objects. Propagation precedence may be specified in the metadata of widgets but may be superseded by user provided position ordering. When a determination is made that the event propagation is not permitted (order is contrary to event precedence or produces an error) method 600 loops back to perform act 606 as before.

When a determination is made that the event propagation is permitted method 600, responsive to detecting a release of the moving object, connects the moving object with the target object using event propagation precedence (act 618). Method 600 sets visual cues for remaining objects in the set of objects to non-display (act 620) and terminates thereafter (act 622).

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the embodiments in the form disclosed. Many modifications and variations will be apparent to those of ordinary skill in the art without departing from the scope and spirit of the embodiments of the invention. The embodiments are chosen and described in order to best explain the principles of the invention and the practical application, and to enable others of ordinary skill in the art to understand the invention for various embodiments with various modifications as are suited to the particular use contemplated.

Embodiments of the invention can take the form of an entirely hardware embodiment, an entirely software embodiment or an embodiment containing both hardware and software elements. In one embodiment, the invention is implemented in software, which includes but is not limited to firmware, resident software, microcode, and other software media that may be recognized by one skilled in the art.

While the present invention have been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of embodiments of the present invention has been presented for purposes of illustration and description, and is not intended to be exhaustive or limited to the invention in the form disclosed. Many modifications and variations will be apparent to those of ordinary skill in the art. The embodiments are chosen and described in order to best explain the principles of the invention, the practical application, and to enable others of ordinary skill in the art to understand the invention for various embodiments with various modifications as are suited to the particular use contemplated.

What is claimed is:

1. A computer-implemented method comprising:
    outputting, for display, a first object and a second object of a plurality of objects, the first object being a publisher of events and the second object being a subscriber of events from the first object, wherein at least the first object is also a subscriber of events from a third object in the plurality of objects or the second object is also a publisher of events to the third object in the plurality of objects;
    responsive to receiving user input to move the first object towards the second object, outputting for display, by the computing device, a visual connection cue for at least one of the first object or the second object, the visual connection cue representing a communication capability of the at least one of the first object or the second object to communicate the events with another of the first object and the second object;
    while the first object moves towards the second object, adjusting, by the computing device, an appearance of the visual connection cue, wherein the appearance of the visual connection cue is indicative of the at least one of the first object or the second object being at least one of a subscriber of events or a publisher of events;

identifying event propagation precedence that indicates whether event propagation of the events from the first object as the publisher to the second object as the subscriber is permitted; and connecting the first object with the second object, based on the identified event propagation precedence, to communicate the events from the first object to the second object.

2. The computer-implemented method of claim 1, further comprising:

outputting for display a movement of the first object in relation to the second object.

3. The computer-implemented method of claim 1, further comprising:

outputting for display the visual connection cue responsive to a movement of the first object.

4. The computer-implemented method of claim 1, wherein adjusting the appearance of the visual connection cue further comprises:

determining whether the first object is within a predefined distance of the second object; and indicating the visual connection cue is in an active and ready state responsive to determining that the first object is within the predefined distance of the second object.

5. The computer-implemented method of claim 1, wherein identifying event propagation precedence further comprises:

determining whether an ordering to connect the first object and the second object is required.

6. The computer-implemented method of claim 1, wherein connecting the first object with the second object further comprises:

using the event propagation precedence responsive to a user input releasing the first object; and hiding the visual connection cue for at least one of the first object and the second object.

7. The method of claim 1, further comprising:

filtering, by the second object, data received from the first object.

8. The method of claim 1, wherein if the visual connection cue is for the first object, an appearance of the visual connection cue is indicative of publishing events, and wherein if the visual connection cue is for the second object, the appearance of the visual connection cue is indicative of subscribing to events.

9. The method of claim 1, further comprising:

outputting, for display, a second visual connection cue for the first object if the first object is also a subscriber of events, and outputting, for display, a third visual connection for the second object if the second object is also a publisher of events.

* * * * *